(12) United States Patent
Shu

(10) Patent No.: US 10,315,520 B2
(45) Date of Patent: Jun. 11, 2019

(54) APPARATUSES AND METHODS OF AN IN-VEHICLE GATEWAY SYSTEM FOR MONITORING AND CONTROLLING IN-VEHICLE SUBSYSTEMS

(71) Applicant: Kuang-I Shu, Plano, TX (US)

(72) Inventor: Kuang-I Shu, Plano, TX (US)

(73) Assignee: SOUTHWEST UNIVERSITY, Chongqing Shi (CN)

( * ) Notice: Subject to any disclaimer, the term of this patent is extended or adjusted under 35 U.S.C. 154(b) by 0 days.

(21) Appl. No.: 15/478,248

(22) Filed: Apr. 4, 2017

(65) Prior Publication Data
US 2018/0281598 A1   Oct. 4, 2018

(51) Int. Cl.
  *B60L 3/00*   (2019.01)
  *G05B 19/042*   (2006.01)
  *G05D 1/00*   (2006.01)

(52) U.S. Cl.
  CPC .......... *B60L 3/0084* (2013.01); *G05B 19/042* (2013.01); *G05D 1/0011* (2013.01); *G05B 2219/25083* (2013.01); *G05B 2219/2637* (2013.01)

(58) Field of Classification Search
  None
  See application file for complete search history.

(56) References Cited

U.S. PATENT DOCUMENTS

| 8,705,527 B1 * | 4/2014 | Addepalli | H04W 4/046 370/389 |
| 2015/0003456 A1 | 1/2015 | Seo et al. | |

* cited by examiner

*Primary Examiner* — Lail A Kleinman
(74) *Attorney, Agent, or Firm* — One LLP

(57) ABSTRACT

An in-vehicle gateway system for monitoring and controlling a plurality of in-vehicle subsystems is disclosed. The in-vehicle gateway system includes a central controller and the central controller is configured to enable one of the in-vehicle subsystems to use a resource of another in-vehicle subsystem. The central controller is also configured to enable one in-vehicle subsystem to use data from yet another in-vehicle subsystem. The one in-vehicle subsystem may be a newly added in-vehicle subsystem. The in-vehicle gateway system also includes a switch fabric that is configured to interconnect the central controller to the plurality of the in-vehicle subsystems and transmit at least a unified control command to at least one of the in-vehicle subsystems.

18 Claims, 9 Drawing Sheets

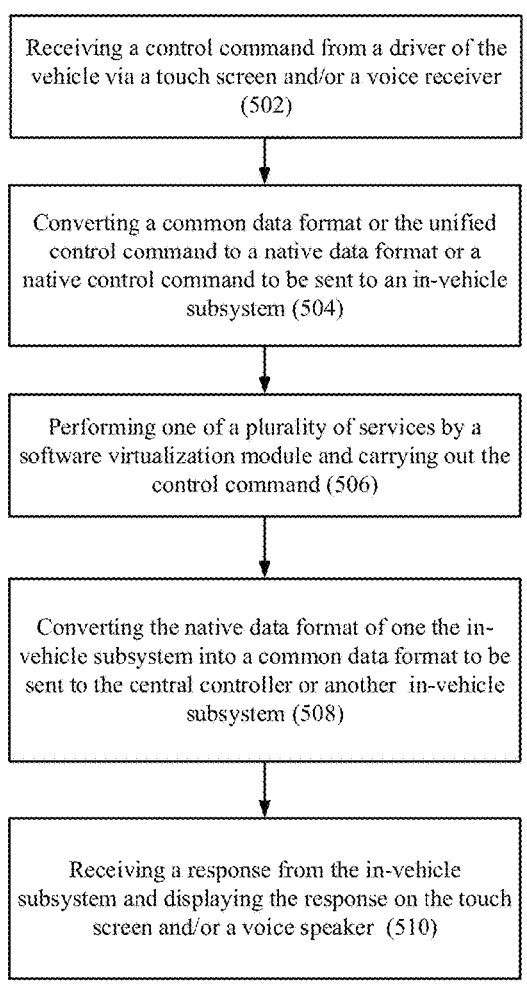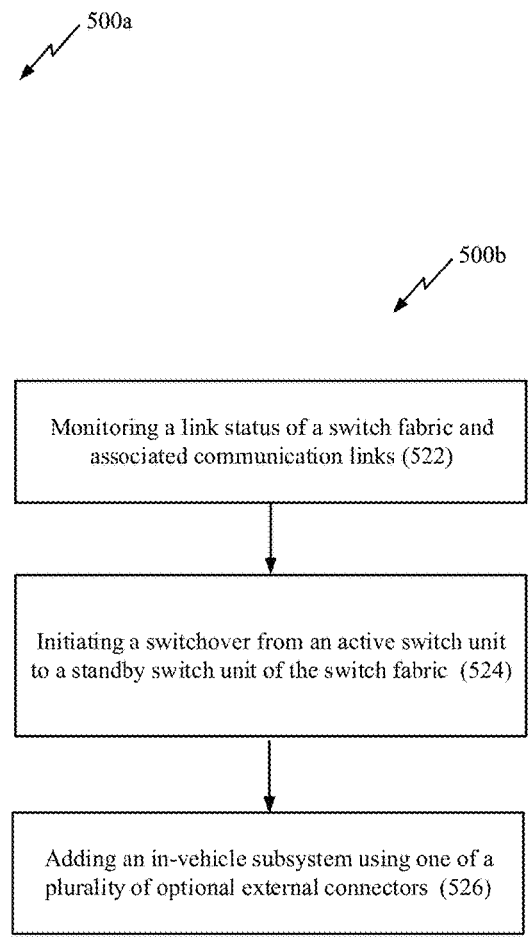
FIG. 5a
FIG. 5b

APPARATUSES AND METHODS OF AN IN-VEHICLE GATEWAY SYSTEM FOR MONITORING AND CONTROLLING IN-VEHICLE SUBSYSTEMS

BACKGROUND

Field

Aspects of the present disclosure relate generally to in-vehicle gateway system, and more particularly to methods and apparatuses for monitoring and controlling multiple in-vehicle subsystems.

Background

Much like how mobile phones have ceased to be only person-to-person communications devices and become technical platforms, in-vehicle electronic devices will too cease to be solely information devices and become technical platforms incorporating all-encompassing features. The features include but are not limited to advanced driver assistance systems (ADAS), navigation, communication, and entertainment. This fundamental shift however will desire a transformation and redesign of the in-vehicle system's technical architecture.

Presently a vehicle's ADAS, communications, and entertainment features exist isolated in separate devices and subsystems, and are each individually built without consideration of other subsystems. This leads to duplicative functions, increased costs, and difficult control, management, maintenance, and upgrade of the entire in-vehicle system.

Thus, there is a need for a central control system architecture built around an in-vehicle gateway system that includes an ADAS and the Internet of vehicles (IoV). The in-vehicle gateway system provides an open platform that integrates information and communication technology (ICT) devices for future vehicles. According to one aspect of the present disclosure, not only will this gateway system orchestrate the common devices and communications management system (CMS) as a collective unit, this open architecture will allow for scalable, flexible and easy development of 3rd party equipment, such as ADAS and vehicle-to-vehicle (V2V) and vehicle-to-infrastructure (V2I) communications, collectively referred as V2X, and new applications. New modules and/or software applications for additional features, repairs, and upgrades can be added later without changing the existing system. This will reduce development efforts as the developer can add new features or applications onto the platform without a need to change the underlying system.

SUMMARY

According to one aspect of the present disclosure, an in-vehicle gateway system for monitoring and controlling a plurality of in-vehicle subsystems within a vehicle includes a central controller. The central controller is configured to enable a third one of the plurality of the in-vehicle subsystems to use a resource of a first one of the plurality of the in-vehicle subsystems. The central controller is also configured to enable the third one of the plurality of the in-vehicle subsystems to use data from a second one of the plurality of the in-vehicle subsystems. The in-vehicle gateway system also includes a switch fabric that is configured to interconnect the central controller to the plurality of the in-vehicle subsystems and transmit at least a unified control command to at least one of the in-vehicle subsystems.

According to another aspect, a method at an in-vehicle gateway system for monitoring and controlling a plurality of in-vehicle subsystems within a vehicle, includes enabling a third one of the plurality of the in-vehicle subsystems to use a resource of a first one of the plurality of the in-vehicle subsystems. The method also includes enabling the third one of the plurality of the in-vehicle subsystems to use data produced by a second one of the plurality of the in-vehicle subsystems wherein the third one of the plurality of the in-vehicle subsystems is a newly added in-vehicle subsystem. The method further includes generating a unified control command by a central controller in response to an input from a driver of the vehicle or an event from one of the plurality of the in-vehicle subsystems, for monitoring or controlling at least one of the in-vehicle subsystems based on a plurality of input data from the one or more of the plurality of the in-vehicle subsystems and predefined policies. The method also includes transmitting the unified control command using a switch fabric on one of associated communication links.

According to yet another aspect of the present disclosure, an apparatus of an in-vehicle gateway system for monitoring and controlling a plurality of in-vehicle subsystems within a vehicle, includes a memory and at least one processor coupled to the memory. The at least one processor is configured to enable a third one of the plurality of the in-vehicle subsystems to use a resource of a first one of the plurality of the in-vehicle subsystems. The at least one processor is also configured to enable the third one of the plurality of the in-vehicle subsystems to use data from a second one of the plurality of in-vehicle subsystems. The third one of the plurality of the in-vehicle subsystems is a newly added in-vehicle subsystem. The at least one processor is further configured to generate a unified control command by a central controller in response to an input from a driver of the vehicle or an event from one of the plurality of the in-vehicle subsystems, for monitoring or controlling at least one of the in-vehicle subsystems. The unified control command is transmitted using a switch fabric on one of associated communication links.

This has outlined, rather broadly, the features and technical advantages of the present disclosure in order that the detailed description that follows may be better understood.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 5a provides a block diagram illustrating another method for monitoring and controlling in-vehicle subsystems, according to one aspect of the present disclosure.

FIG. 5b provides a block diagram illustrating a method for monitoring a switch fabric and communication links and for adopting a new subsystem, according to one aspect of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
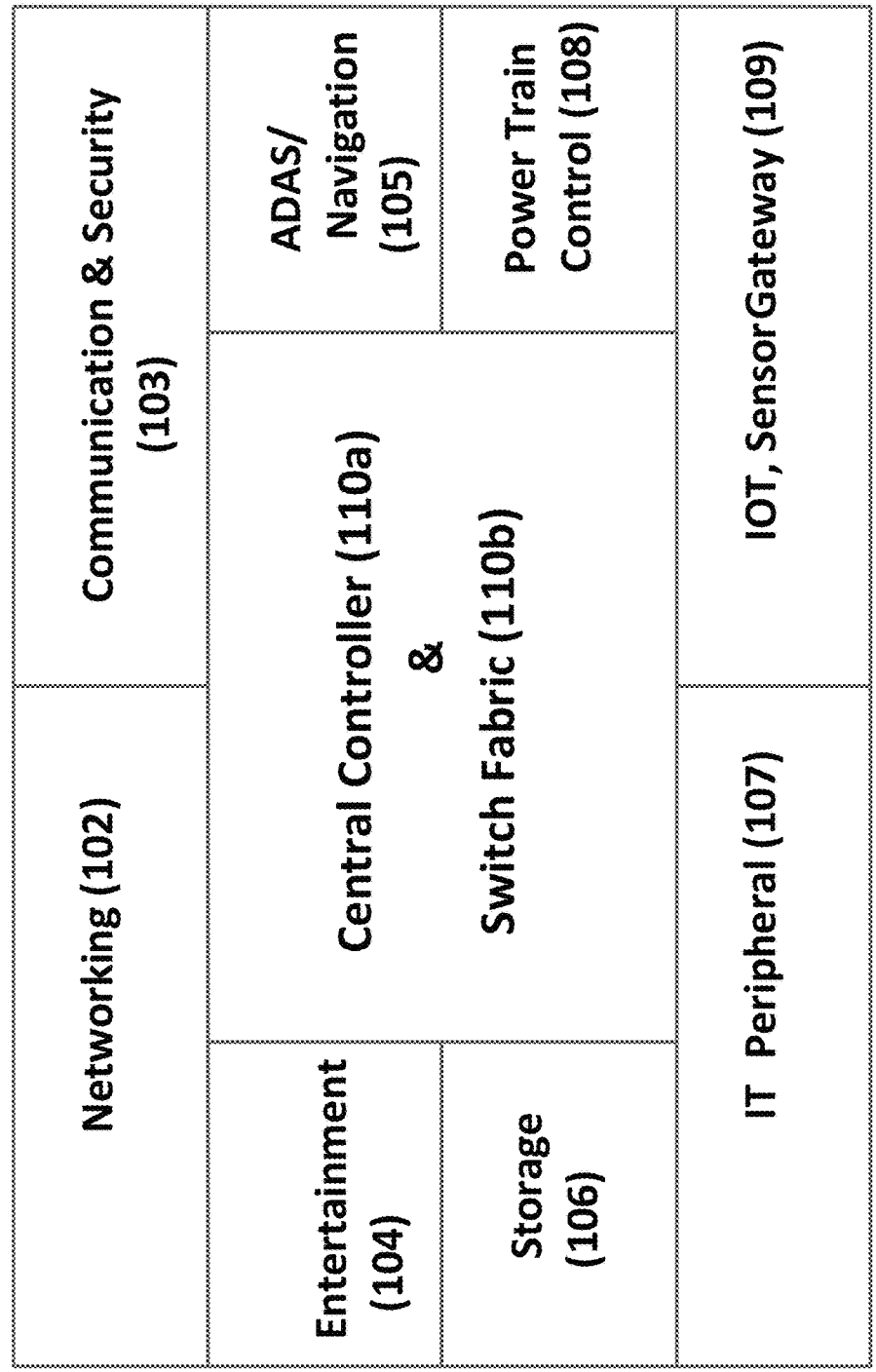
FIG. 1 provides a block diagram for a functional view of an example in-vehicle gateway system, according to one aspect of the present disclosure.

FIG. 1 provides a block diagram for a functional view of an in-vehicle gateway system 100, according to one aspect of the present disclosure. The in-vehicle gateway system 100 is also termed Internet of Vehicle (IoV) gateway system because the in-vehicle gateway system 100 may connect the vehicle with the Internet, as described below.

The in-vehicle gateway system 100 may include a number of in-vehicle subsystems. According to one example embodiment, the in-vehicle gateway system 100 may include a networking subsystem 102, a communication and security subsystem 103, and an entertainment subsystem 104. The in-vehicle gateway system 100 may also include an advanced driver assistance system (ADAS) and navigation subsystem 105, a storage subsystem 106, an IT peripheral subsystem 107, and an Internet of things (IoT) and sensor gateway subsystem 109. In general, an in-vehicle subsystem may include a set of in-vehicle devices and an interface that connects the set of in-vehicle devices with the in-vehicle gateway system and other in-vehicle subsystems.

The networking subsystem 102 provides an interface to and communicate with the communication networks such as 3G/4G/5G wireless networks, WiFi local area networks, a long term evolution-vehicle (LTE-V) network, or a local Ethernet network. Through the networking subsystem 102, the in-vehicle gateway system 100 may connect with outside networks and potentially other vehicles. The communication and security subsystem 103 may manage a firewall, and a virtual private network (VPN) related functions for the security of the in-vehicle gateway system. The entertainment subsystem 104 may provide interfaces to video/audio games and other entertainment related in-vehicle or outside devices. The ADAS and navigation subsystem 105 includes various ADAS devices and an interface between the ADAS devices and the in-vehicle gateway system or other in-vehicle gateway subsystems. The ADAS device may include but are not limited to various sensors, cameras, radars, GPS, and a laser light based radar (ldar) sensors.

The storage subsystem 106 include various internal or external storage systems such as solid state device (SSD) memory storage devices, hard disk driver or other storage devices within the vehicle. The storage subsystem 106 provide an interface for the in-vehicle gateway system and other in-vehicle subsystem to access the storage devices. The IT peripheral subsystem 107 provides an interface to IT peripheral devices such as liquid crystal display (LCD) devices, speakers, microphones, or other input-output IT device within the vehicle. The Internet of things (IoT) and sensor gateway subsystem 109 provides an interface to Internet connected devices and sensors. The interface may be a Bluetooth network, a control area network (CAN) or other personal area network within the vehicle.

At center of the in-vehicle gateway system 100 are a central controller 110*a*, a switch fabric 110*b* and a power train control 108. The power train control 108 provides an interface to the traditional control system of a vehicle. The traditional control system of the vehicle may include multiple electronic control units (ECU). In one example, the power train control 108 may execute commends to the mission-critical ECUs, in conjunction with a predefined, rule-based policy, road environments, and images from the ADAS subsystem. For example, when the central controller 110*a* determines that a fault condition has occurred in a ADAS device, the power train control 108 may return the vehicle to "manual" control for the driver to takes over operating of the vehicle. In one configuration, the power train control 108 includes at least one of an Ethernet-1T interface, an Ethernet interface, and a native interface, and is configured to control one of a gasoline vehicle, an electric vehicle and a hybrid vehicle via a control command from the central controller 110*a* using the switch fabric 110*b* or from an authorized mobile device.

The above-mentioned in-vehicle subsystems provide interfaces to various in-vehicle devices and parts that are included in the subsystems. As such, one in-vehicle subsystem may convert a native data format of the in-vehicle subsystem into a common data format for data to be sent to the central controller or another in-vehicle subsystem. The subsystem may also convert the common data format to the native data format or the unified control command to a native control command format to be sent to one or more in-vehicle devices.

The central controller 110*a* may use a decision module to help generate and issue a unified control command for monitoring or controlling an in-vehicle subsystem, based at least in part on a plurality of input data from one or more of sensors and predefined policies. The unified control command is based on a control command structure common to all the in-vehicle subsystems. The central controller 110*a* may also filter, fusion and combine various types of pre-processed or post-processed data from the above-mentioned in-vehicle subsystems, including data from multiple sensors.

The central controller 110*a* may provide a unified scheme of the control, management, and supervision among the in-vehicle subsystems. As such, the central controller 110*a* enable sharing of resource among the above-mentioned in-vehicle subsystems. For example, a new application or in-vehicle subsystem may use the resource of an existing subsystem or application, instead of deploying a new set of resources. Additionally, the central controller 110*a* may enable the new application to make use of the data produced by an existing in-vehicle subsystem, instead of having the new application produce its own data.

The switch fabric 110*b* may interconnect the central controller to the in-vehicle subsystems and transmit a unified control command to an in-vehicle subsystem. In one example configuration, the switch fabric 110b may be a low-latency Ethernet switch fabric that connects between the central controller 110a and the ADAS subsystem. The Ethernet switch fabric may be in a dual-star topology for 1+1 active and standby redundancy. The switch fabric management software monitors the internal and link status of each switch unit and initiates a switchover once the central controller 110a identifies a major fault in the active switch unit or its associated links. For backward compatibility, the switch fabric may also act as a control area network (CAN)/flexible data-rate (CAN-FD) bridge for the instrument cluster and a head-up display.

There are several advantages associated with the in-vehicle gateway system 100. Example effects of the in-vehicle gateway system 100 may include maximizing functionality, flexibility, scalability, and high availability of the in-vehicle gateway system. The effects may also include low latency, ease of separating hardware/software/application, and ease of designing, developing, upgrading, and replacing hardware and software within the vehicle.

Figure 2:
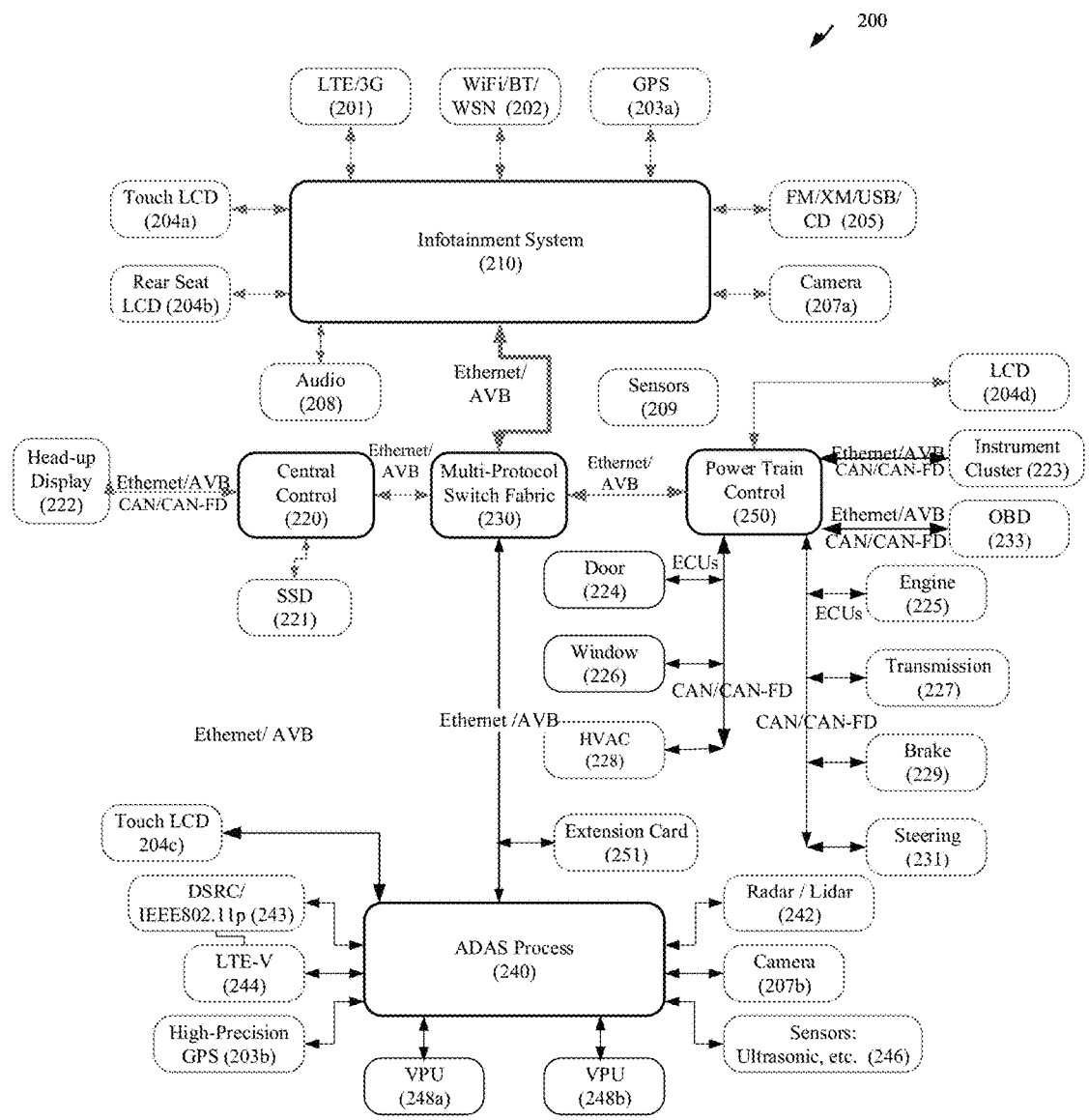
FIG. 2 provides a block diagram for a hardware structural view of an example in-vehicle gateway system, according to one aspect of the present disclosure.

FIG. 2 provides a block diagram of an example hardware structural view or configuration 200 of the in-vehicle gateway system 100, according to one aspect of the present disclosure. The hardware configuration 200 shows one possible hardware configuration for the in-vehicle gateway system 100 of FIG. 1. The hardware configuration 200 includes an infotainment system 210, a central control 220, a multi-protocol switch fabric 230, a power train control 250, and an ADAS subsystem 240.

In one example configuration, the infotainment subsystem 210 along with various connected devices may implement the entertainment subsystem 104, the networking subsystem 102, the IT peripheral subsystem 107, and the communication and security subsystem 103 of FIG. 1. In one example configuration, the infotainment subsystem 210 may have a single central processor or CPU shared among the above mentioned in-vehicle subsystems. In another configuration, the above mentioned in-vehicle subsystems may be housed in a single physical unit. In an alternative configuration, each of the subsystems may have its own CPU in addition to the central CPU, to facilitate local data processing.

The infotainment subsystem 210 may be connected to various devices found in a vehicle now days. For example, infotainment subsystem 210 may be connected to a LTE/3G compatible wireless network 201, a WiFi/Bluetooth network 202, a GPS device 203a, a touch LCD device 204a, a rear seat LCD device 204b, a FM or XM radio and CD player with a USB connector 205, an audio device 208, and sensors 209. The infotainment subsystem 210 may be connected to the devices via a wireless link such as a WiFi connection or a wired connection.

The infotainment subsystem 210 may be connected to the central control 220 and the power train control 250 via a multi-protocol switch fabric 230 and internal Ethernet links. In addition to or in place of the Ethernet connection, the information subsystem 210 may be connected to the central control 220 via a wireless link.

In one example configuration, the central control 220 and multi-protocol switch fabric 230, along with various connected devices may provide an implementation for the central controller 110a and the switch fabric 110b of FIG. 1. The central control 220 may be connected to a head-up display 222 and a solid state drive (SSD) device 221. The power train control 250 provides implementation for the power train control 108 of FIG. 1. The central control 220 along with the multiprotocol switch fabric 230 may provide a unified scheme of the control, management, and supervision among infotainment subsystem 210 and the ADAS subsystem 240. The power train control 250 may perform various vehicle control, monitor and supervision functions. Thus, the power train control 250 is connected with various vehicle parts, including a vehicle engine 225, a vehicle transmission 227, a vehicle brake system 229, and a vehicle steering system 231. Other parts of the vehicle connected with the power train control 250 may include a door system 224, a window system 226, a HVAC system 228, an instrument cluster 223, and an on-board diagnostics (OBD) 233. The connections to the vehicle parts include multiple electronic control units (ECUs), Ethernet/Audio Video Bridging (AVB) or CAN or CAN-FD.

The ADAS process 240 along with various sensor and navigation devices may implement the ADAS/navigation subsystem 108 of FIG. 1. The sensors and navigation devices may include cameras 207b, radar/lidar 242, multiple sensors 246, and GPS receivers 203b. The sensors 246 may include gyroscope sensors, ultrasonic sensors, and others. In one configuration, optional expansion slots may accommodate multiple video process units (VPUs), such as the VPU 248a and 248b, to facilitate processing of video data from multiple camera and sensors. The extension card 251 may accommodate additional devices, or processors, as a need arises.

The ADAS process 240 provides a platform for driver assistance functions and related devices within the vehicle. In one example configuration, the ADAS process 240 has its dedicated processor or processors in part because the ADAS process 240 may process a large amount of data to accommodate applications such as the automatic pilot driving.

The example hardware configuration 200 may include the same or similar types of devices in different parts of the example in-vehicle gateway system. For example, the camera 207a is used in the infotainment system 210 and the camera 207b is associated with the ADAS process 240. Similarly, the LCD 204a and rear seat LCD 204b are associated with the infotainment system 210, the touch LCD 204c is associated with the ADAS process 240, and the touch LCD 204d is associated with the power train control 250.

Figure 3:
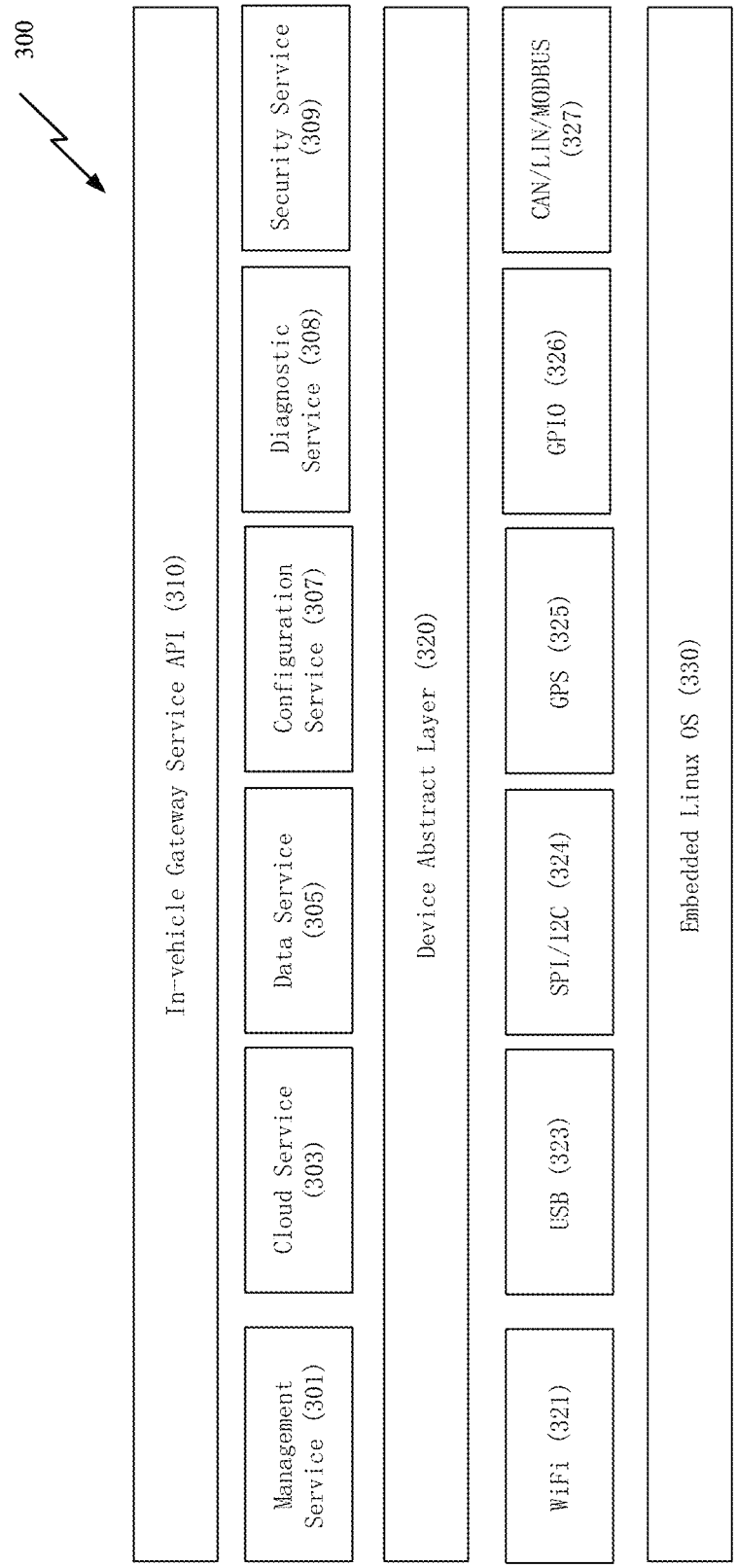
FIG. 3 provides perspective views of a software architecture of the in-vehicle gateway system, according to one aspect of the present disclosure.

FIG. 3 provides a block diagram of a service architecture 300 for an in-vehicle gateway system, according to one aspect of the present disclosure. According to one example aspect of the present disclosure, the in-vehicle gateway system may abstract hardware resources and generic software modules as service modules. The service architecture 300 virtualizes various in-vehicle gateway system functions to reduce the cost and complexity of the development of various new in-vehicle gateway applications.

In one example configuration, the in-vehicle gateway service architecture 300 may include a device abstract layer 320, which represents various physical in-vehicle devices as virtual entities. The virtual entities provide various services to an in-vehicle gateway system such as the in-vehicle gateway system 100 and the in-vehicle gateway system 200. The example physical in-vehicle devices may include a WiFi device 321, a USB device 323, an inter integrated circuit communications (I²C) and serial-peripheral interface (SPI) device 324, a Global Positioning System (GPS) device 325, a general-purpose input/output (GPIO) port device 326, and a control area network (CAN)/local interconnect network (LIN)/modbus device (327). The physical devices share a common operating system (OS) such as a Linux OS 330.

The device abstraction layer 320 provides a set of services based on the services provided by the underlying physical in-vehicle devices.

Various services that the in-vehicle gateway service architecture 300 provide may include a management service 301, a cloud service 303, a data service 305, a configuration service 307, a diagnostic service 308, and a security service 309. The in-vehicle gateway service architecture 300 provides the services to various in-vehicle subsystems and applications via an in-vehicle gateway service application program interface (API) 310.

The management service 301 is used to manage the in-vehicle gateway system, including deployment, upgrade, and configuration services. For remote configuration and management, the management service 301 relies on the cloud service 303 and the configuration service 307. The management service 301 provides an management service API with a mode selection option to allow a service client to select either a local management or a remote management.

Figure 8:
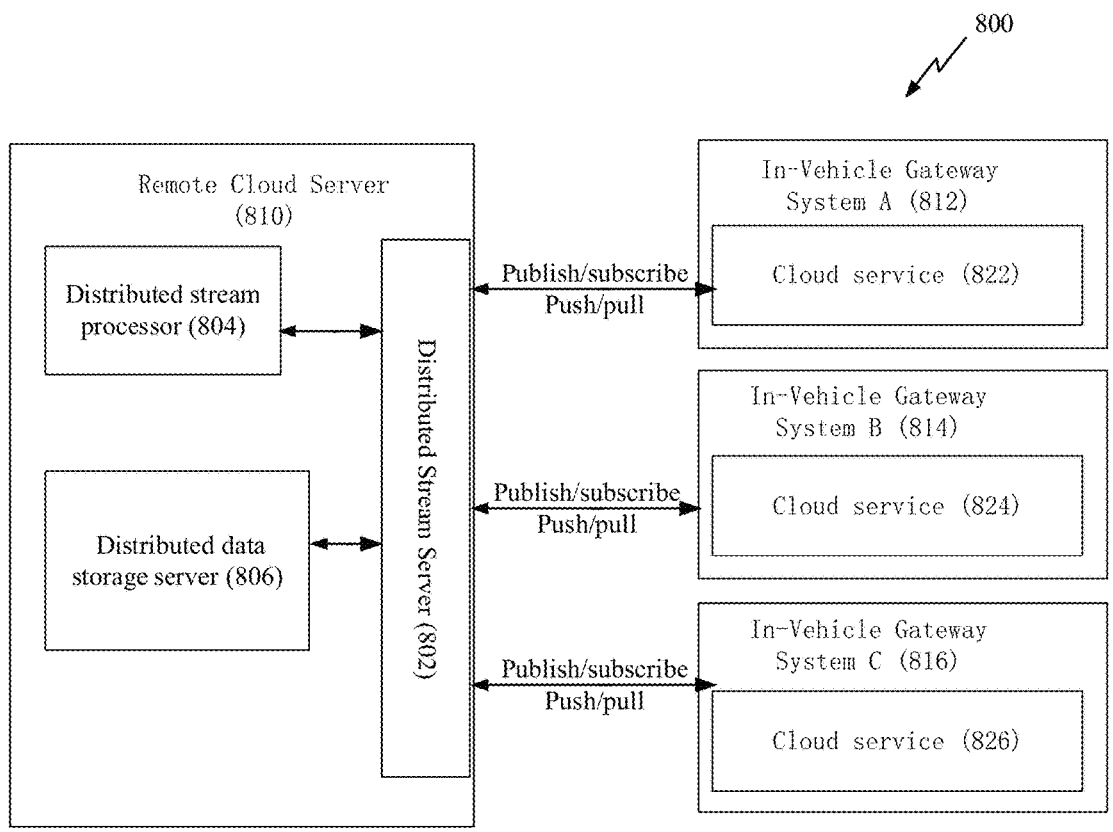
FIG. 8 provides a block diagram illustrating a process for interactions between the in-vehicle gateway system and an external cloud server, according to one aspect of the present disclosure.

The cloud service 303 is used by the in-vehicle subsystems or applications to communicate with a remote cloud server. In addition to simple publishing/subscribing service, the cloud service 303 provides a cloud service API to simplify often complicated interaction flows such as request/response or remote resource managements. The cloud service is also used by applications or in-vehicle subsystems to communicate with a remote cloud server. The cloud service API simplifies the implementation of more complex interaction flows such as request/response or remote resource management. An example of the cloud service 303 is illustrated in FIG. 8 and described therein.

Figure 6:
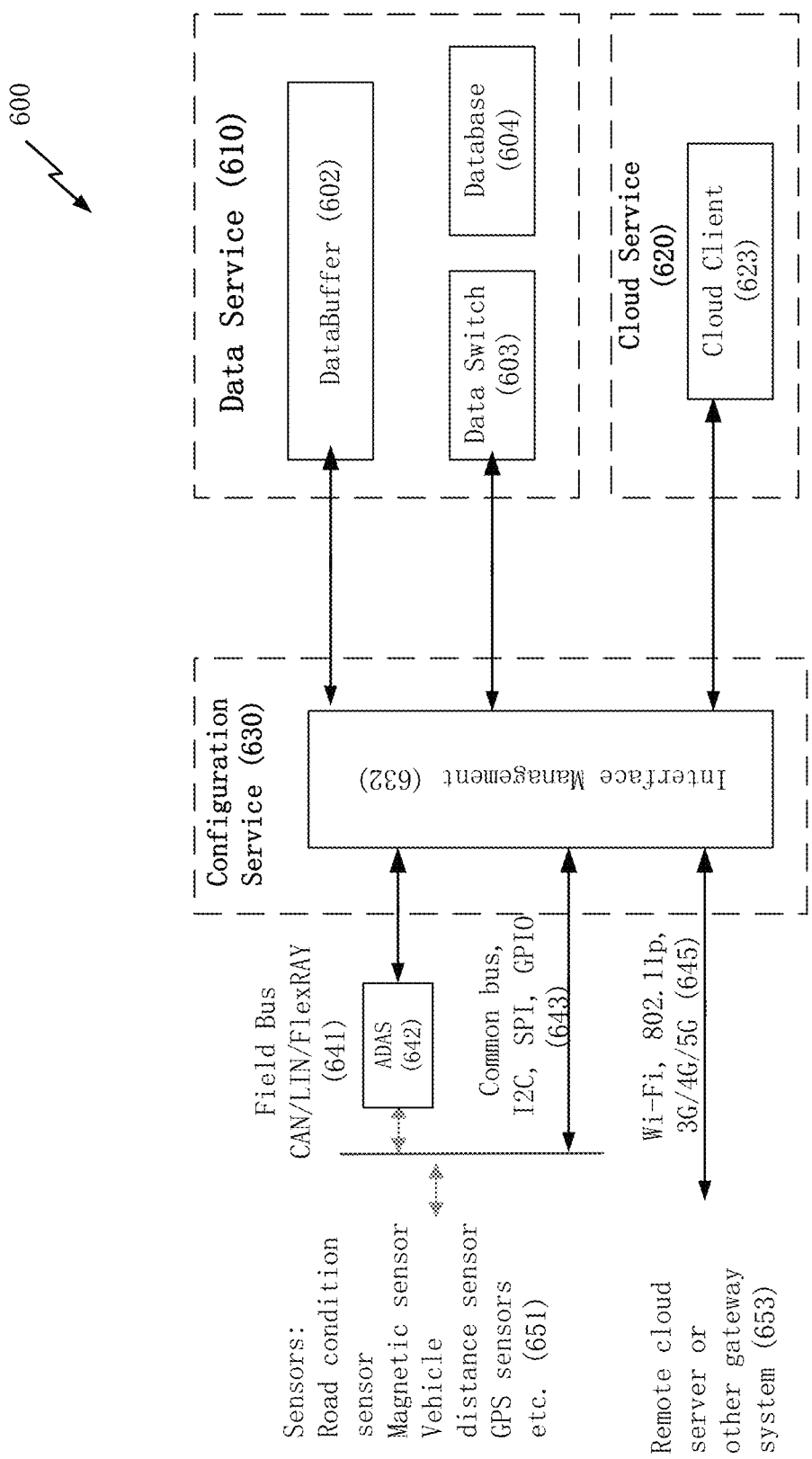
FIG. 6 provides a block diagram illustrating a process of sensor data transmission at an in-vehicle gateway system, according to one aspect of the present disclosure.
Figure 7:
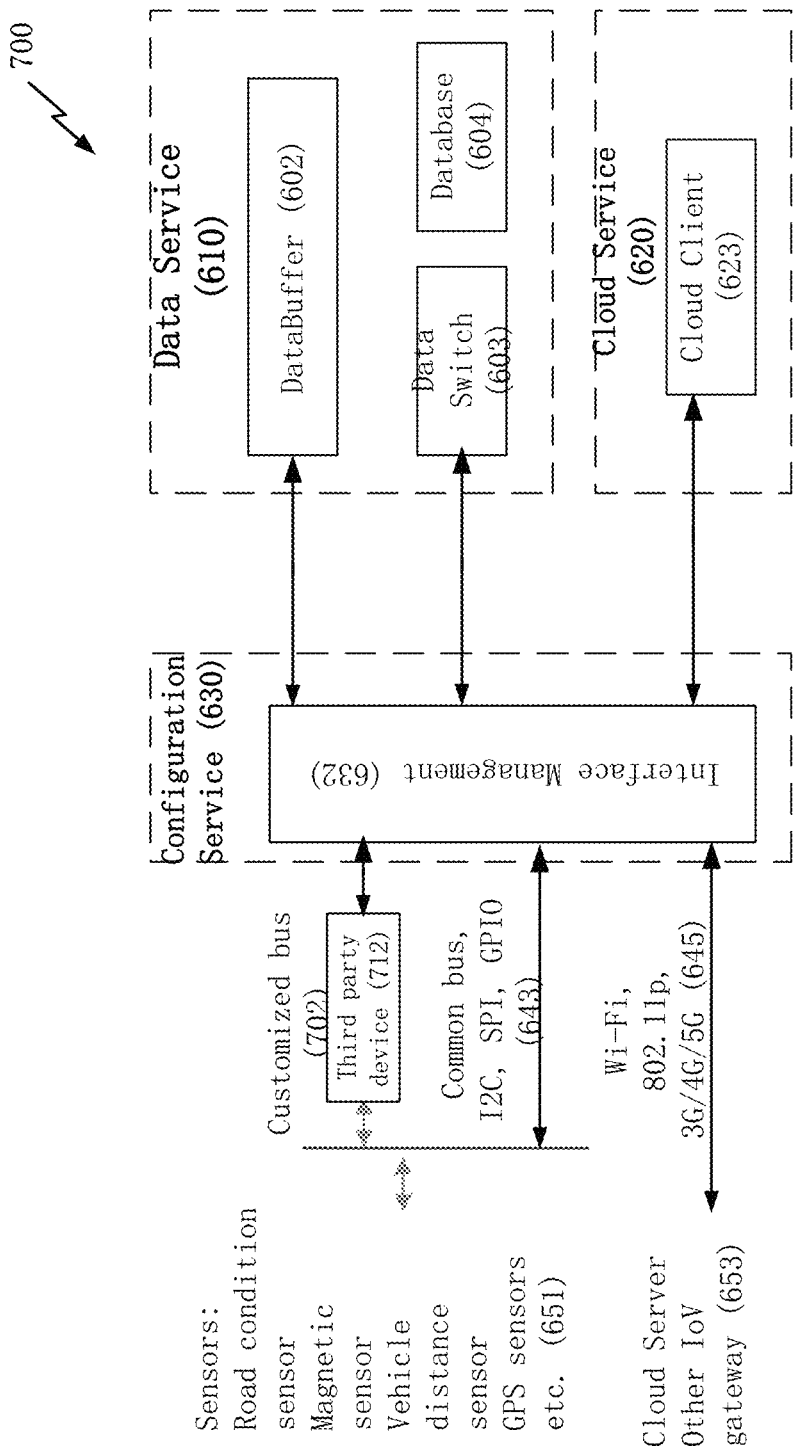
FIG. 7 provides a block diagram illustrating a process of sensor data transmission at an in-vehicle gateway system, using a customized bus, according to one aspect of the present disclosure.

The data service 305 provides capabilities to store and forward data such as telemetry data collected by various in-vehicle devices and publish the collected data to various in-vehicle subsystems or applications. The data service 305 also supports the data filter function. An example of the data service 305 and its interaction with other service are illustrated in FIG. 6 and FIG. 7 and described therein.

The configuration service 307 includes the interface management and configuration file management modules. The configuration service 307 may provide an interface management module to process data from different buses, such as the ADAS interface, I²C, SPI, GPIO, customized buses, etc. The configuration service 307 may also transform different data formats to a unified data format for the data service 305. The configuration file management module is used to save/restore/update configuration files such as gateway network configuration files, database configuration files, and data service configuration files, etc.

The diagnostic service 308 may include an in-vehicle gateway diagnostic module and a vehicle diagnostic module. The in-vehicle gateway diagnostic module may verify the in-vehicle gateway system's basic hardware connection such as connection related to Ethernet, I²C, GPIO, USB, CAN, etc. The in-vehicle gateway diagnostic module may verify software features such as database operation verification, cloud server event verification, etc. The vehicle diagnostic module may check the vehicle's status from various ECUs.

The security service 309 may provide protection against hacking, theft, distributed denial of service (DDoS), and counterfeit parts. The security service 309 may implement message encryption and authentication stack for secure connections. The security service 309 may also support a pseudonyms stack to avoid tracking for privacy protection.

All the processors within the in-vehicle gateway system implements a secure boot so that only known approved code is run.

Figure 4:
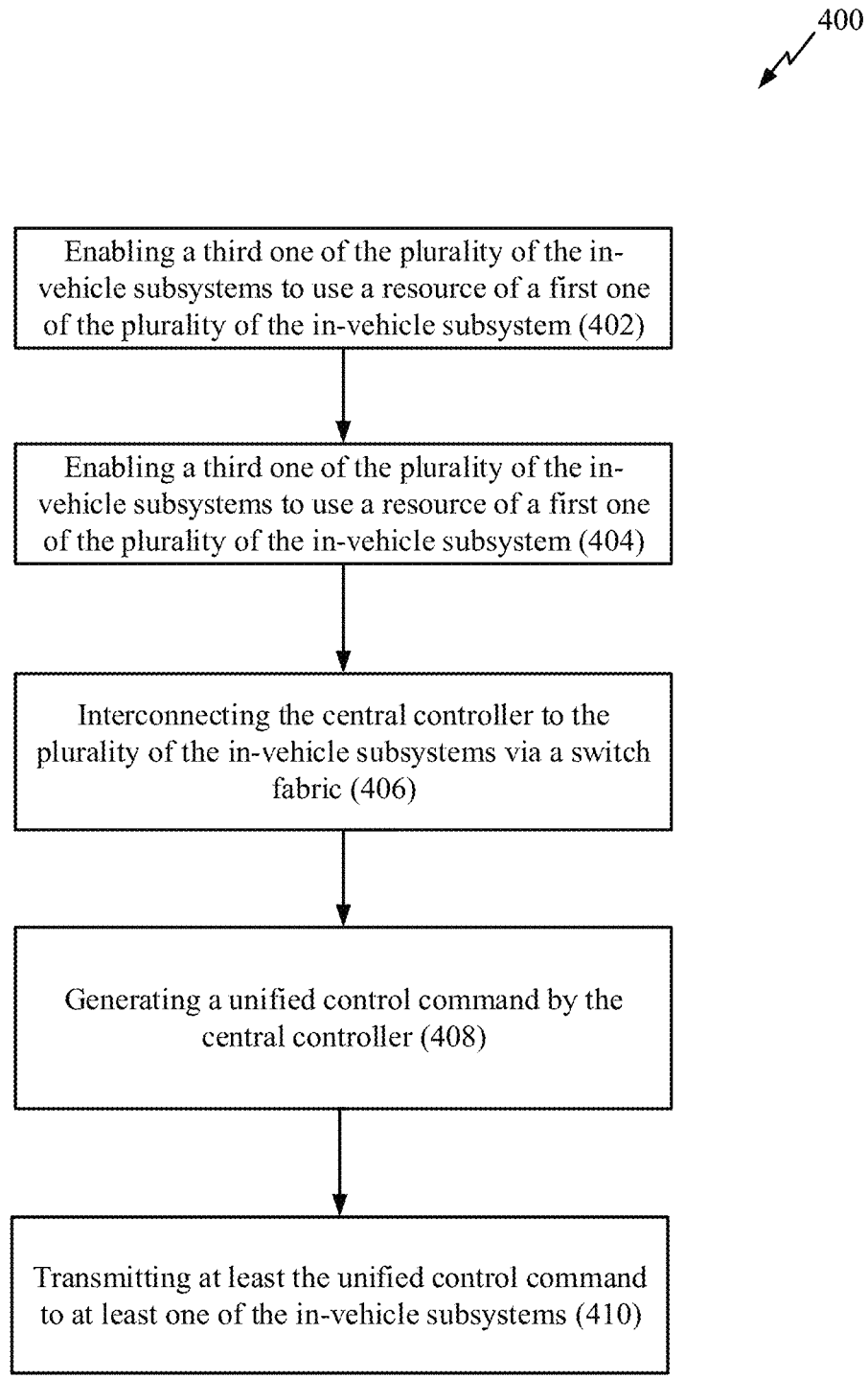
FIG. 4 provides a block diagram illustrating a method for monitoring and controlling in-vehicle subsystems, according to one aspect of the present disclosure.

FIG. 4 provides a block diagram illustrating a method 400 for an in-vehicle gateway system to control and monitor various in-vehicle subsystems of a vehicle, according to one aspect of the present disclosure. The method 400 may include enabling a third one of the plurality of the in-vehicle subsystems to use a resource of a first one of the plurality of the in-vehicle subsystem at 402. The method 400 may also include enabling the third one of the plurality of the in-vehicle subsystems to use data from a second one of the plurality of the in-vehicle subsystems at 404. The method 400 also includes interconnecting the central controller to the plurality of the in-vehicle subsystems using a switch fabric at 406, generating a unified control command by the central controller at 408 and transmitting the unified control command to one of the in-vehicle subsystems at 410.

The step of enabling the third one in-vehicle subsystems to use the resource of the first one in-vehicle subsystem at 402 may include sharing a resource that is originally designated exclusively for one subsystem or application. In one example configuration, instead of adding an entire set of new hardware and software resources for a new application/subsystem, the new application/subsystem can share the resource of an existing subsystem, even if the existing subsystem and new subsystem are from two different vendors. The resource sharing is made possible at least in part by the central controller that provides a unified control command structure common to all subsystems. The resource sharing is made possible also because the software virtualization module abstracts a vendor specific hardware into a generic service and provides the service to the new subsystem/application.

The step of enabling the third one of the plurality of the in-vehicle subsystems to use data from the second one of the plurality of the in-vehicle subsystem at 404 may include sharing data that was originally designated exclusively for one subsystem or application. In one example configuration, instead of adding an entire set of new hardware and software to produce the data for a new application/subsystem, the new application/subsystem may share the data produced by and for an existing subsystem, even if the existing subsystem and the new subsystem are from two different vendors. The data sharing is made possible at least in part by the central controller that provides a unified control command structure common to all subsystems. The data sharing is made possible also because the software virtualization module abstracts a vendor specific hardware into a generic service and provides the service to the new subsystem/application.

The step of interconnecting the central controller to the plurality of the in-vehicle subsystems at 406 including using a switch fabric to connect the central controller to the multiple in-vehicle subsystems. The switch fabric may include one or more of a controller area network (CAN), a local interconnect network (LIN), and a CAN-flexible data-rate (FD), an Ethernet CAN, a local interconnect network (LIN), a low-latency Ethernet switch fabric, and a one-pair Ethernet (Ethernet-1T) switch fabric.

The step of generating the unified control command by the central controller at 408 may include generating a control command structure common to the plurality of in-vehicle subsystems. That is, the command structure is recognizable and accepted by each of the in-vehicle subsystems. One example of such command structure is an instruction based on standard Ethernet frame structure. The unified control command may be generated in response to an input from a driver of the vehicle or an event from one of the in-vehicle subsystems. For example, when the driver issues a left turn command, the central controller generates a unified control command and sends the command to the power train control subsystem for making a left turn. For another example, when the ADAS subsystem reports detection of an object on the road by camera or other sensors, the central controller also generates a unified control command to the power train subsystem and the ADAS subsystem to swerve around the object.

The step of transmitting the unified control command at 410 may include transmitting the unified control command on one or more of the communication links. One example of such a communication link is an Ethernet link.

The method 400 of FIG. 4 illustrates one example process for the in-vehicle gateway system to control and monitor the in-vehicle subsystems. The steps of the method 400 and the sequence of the steps are for illustration purpose. Some of the steps may be combined or skipped. Different sequences and additional or alternative steps are certainly possible. As such, the method 400 is a non-limiting example method for controlling and monitoring a plurality of in-vehicle subsystems by the in-vehicle gateway system.

FIG. 5a provides a block diagram illustrating a method 500a for the in-vehicle gateway system to control and monitor a plurality of in-vehicle subsystems, according to one aspect of the present disclosure. The method 500a may include receiving a control command from a driver of the vehicle via a touch screen and/or a voice receiver at 502, and converting the common data format into a native data format or the unified control command into a native control command format for the data or the unified control command to be sent to an in-vehicle subsystem at 504. The method 500a may also include performing one of a plurality of services by a software virtualization module and carrying out the control command at 506, converting the native data format of an in-vehicle subsystem into the common data format for data to be sent to the central controller or an in-vehicle subsystem at 508, and receiving a response from the in-vehicle subsystem at 510.

The step of receiving the control command from the driver of the vehicle at 502 may include receiving a command via an in-vehicle voice receiving device or from an in-vehicle touch screen. The receiving device may also have the capability to interact with the driver to clarify an ambiguous command or display an error if the received command is ambiguous or cannot be carried out.

The step of converting the unified control command at 504 may include converting the common control command to a command in a format native to an in-vehicle subsystem. For example, the control command to adjust a sensor, such as a camera, is issued in a unified control command format from the central controller. The unified command is then converted into a command native to the sensor device. For example, a sensor may have its own control command, specific to the vendor of the camera. The unified control command is translated into the command that is understandable to the device of the specific vendor.

The step of performing at least one of a plurality of services by the software virtualization module at 506 may include providing a service to the central controller or an in-vehicle subsystem using one or more of in-vehicle devices. The service is provided without burdening the recipient of the service with the details specific to the one or more of the in-vehicle devices. That is, the central controller or the in-vehicle subsystem may use the service provided by a device without being aware of the details of how the service is provided by the device or any details about the device itself.

The step of converting the native data format of an in-vehicle device into the common data format at 508 may include converting the format of data generated by the in-vehicle device into the common data structure known to the central controller. For example, an in-vehicle radar may generate data in a format specific to the radar vendor. The data is converted into the common data structure that can be further processed and used either by the central controller or the ADAS subsystem. The radar data may also be used by other in-vehicle subsystems or a newly added subsystem or application.

The step of receiving the response from the in-vehicle subsystem at 510 may include receiving a response from the subsystem that carries out the unified control command in collaboration with one or more in-vehicle devices. The central controller may also display the response in a touch screen or play the response in a speaker, depending on the response output format configured by the driver.

The method 500a of FIG. 5a illustrates one example process for the in-vehicle gateway system to control and monitor in-vehicle subsystems. The steps of the method 500a and the sequence of the steps are for illustration purpose. Some of the steps may be combined or skipped. Different sequences and additional or alternative steps are certainly possible. As such, the method 500a is a non-limiting example method for controlling and monitoring a plurality of in-vehicle subsystems by the in-vehicle gateway system.

FIG. 5b provides a block diagram illustrating another method 500b for the in-vehicle gateway system to monitor a switch fabric and communication links and adopt a new subsystem, according to one aspect of the present disclosure. The method 500b may include monitoring a link status of the switch fabric and associated communication links at 522, initiating a switchover from an active switch unit to a standby switch unit of the switch fabric at 524, and adding an in-vehicle subsystem using one of optional expansion connectors at 526.

The step of monitoring the link status of the switch fabric and associated communication links at 522 may include real-time monitoring of the active unit of the switch fabric and the communication links that connect the active unit of the switch fabric with the in-vehicle subsystems. The monitoring may include polling for a status report of the active switch unit and the communication links in a real-time manner. The monitoring may also include receiving scheduled status reports from the active switch unit and the communications links. In one embodiment, the switch fabric is in a one-to-one active-standby redundancy configuration.

The step of initiating a switchover from the active switch unit to the standby unit of the switch fabric at 524 may include activating the standby unit of the switch fabric when a fault condition in the active unit of the switch fabric or an associated communication link is detected by or reported to the central controller. In one example configuration, the switch fabric is an Ethernet switch with a one-to-one redundancy configuration. When a fault condition occurs at the active Ethernet switch unit, the standby unit is activated in a real-time manner and takes over the responsibility of managing the communications between the central controller and the in-vehicle subsystems.

The step of adopting an in-vehicle subsystem using one of a plurality of optional expansion connectors at 526 may include adopting a new application or in-vehicle subsystem using the platform provided by the in-vehicle gateway system. For example, a black box subsystem may be added to record critical, instantaneous data related to driving and vehicle conditions. The recorded data can be used to determine the cause or causes of an accident when a need arises. In one example configuration, a permanent recording device is plugged into an optional connector. The central controller then routes identified critical data from other subsystems such as the ADAS subsystem and power train control subsystem to the recording device of the newly added black box subsystem. Services such as the configuration service, the data service, the cloud service and the management service may be employed in the process of adding the black box subsystem. Other subsystems and applications may be added, sharing the resources and data of the existing subsystems.

The method 500b of FIG. 5b illustrates one example method for monitoring the switch fabric and communication links and adopting a new subsystem. The steps of the method 500b and the sequence of the steps are for illustration purpose. Some of the steps may be combined or skipped. Different sequences and additional or alternative steps are certainly possible. As such, the method 500b is a non-limiting example method for monitoring a switch fabric and communication links by the in-vehicle gateway system.

FIG. 6 provides a block diagram illustrating a process flow 600 for sensor data transmission, according to one aspect of the present disclosure. As described above, one function of the data service is storing and forwarding data and publishing the data to a remote data server for various applications. One example of the data is telemetry data collected by an in-vehicle subsystem. The process flow 600 shows an example sensor data transmission flow within an in-vehicle gateway system. In one example embodiment, in-vehicle devices such as various sensors 651, collect sensor data in its native formats. The various sensors 651 may include a road condition sensor, a magnetic sensor, a vehicle distance sensor, and a GPS sensor, for example. The collected sensor data is sent to the ADAS subsystem 642 via a field bus such as a control area network (CAN), a local interconnect network (LIN) or a FlexRay 641.

The field sensor data is parsed and encapsulated into a common data format such as Ethernet packets at the ADAS interface 642. The interface management 632 of the configuration service 630 is employed to handle interface packets for the sensor data encapsulated in the Ethernet packets. In some embodiment, the interface management 632 handles data from different buses, such as an ADAS interface, I²C, SPI, GPIO, etc. Different data formats are transformed to a unified data format for the data service 610. Some sensor data may be forwarded to the interface management 632 without going through the ADAS interface 642. Instead, the data are forwarded via one of a common buses, such as I²C, SPI, or GPIO 643.

Furthermore, the data service buffers 602, the data switch 603 and the database 604 of the data service 610 may be used to buffer and filter the sensor data. The buffered and filtered sensor data may be forwarded to a remote cloud server or other gateway system 653 by the cloud client 623 via the wireless communication protocol WiFi, 802.11p, 3G/4G/5G 645 and the interface management 632 of the configuration service 630.

FIG. 7 provides a block diagram illustrating a process flow 700 for sensor data transmission, using a customized bus, according to one aspect of the present disclosure. The process flow 700 is the same as the process flow 600, as shown in FIG. 6, except that a customized bus 702 is used in place of the control area network (CAN)/local interconnect network (LIN) or FlexRay 641 and a third-party device 712 in place of the ADAS interface 642. According to one configuration, the in-vehicle devices such as various sensors 651, collect sensor data in native formats. The collected sensor data is sent to the third-party device 712 and forwarded to the interface management 632 via the customized bus 702. The other parts of the process flow 700 are the same as the process flow 600.

FIG. 8 provides a block diagram illustrating a process 800 for interactions between an in-vehicle gateway system such as the in-vehicle gateway system 200 and an external cloud server, according to one aspect of the present disclosure. The process 800 includes in-vehicle gateway systems 812, 814, and 816, which in turn uses cloud services 822, 824, and 826 respectively for monitoring and controlling of their respective in-vehicle subsystems. The cloud services 822, 824, and 826 interacts with a remote cloud server 810. The remote cloud server 810 may include a distributed stream server 802, a distributed stream processor 804, and a distributed data storage server 806. An example of the distributed stream server 802 is Apache Kafka, which provides an open-source stream processing platform. An example of the distributed stream processor 804 is Apache Storm, which provides an open source based, distributed stream processing computation framework. An example of the distributed data storage server 806 is Apache Hadoop, which provides an open-source software framework for distributed storage and processing of big data sets using a specialized programming model such as the MapReduce programming model.

In an example cloud data flow, the cloud services 822 through 826 may publish and push the data collected at the in-vehicle gateway systems 812, 814, and 816, to the distributed stream server 802 of the remote cloud server 810. The distributed stream server 802 may use services from a distributed stream processor 804 and a distributed data storage server 806 to process and store the data from the in-vehicle gateway systems 812, 814, and 816. The distributed stream server 802 may also respond to data requests from the in-vehicle gateway systems 812, 814, and 816 with the processed and stored data.

Figure 9:
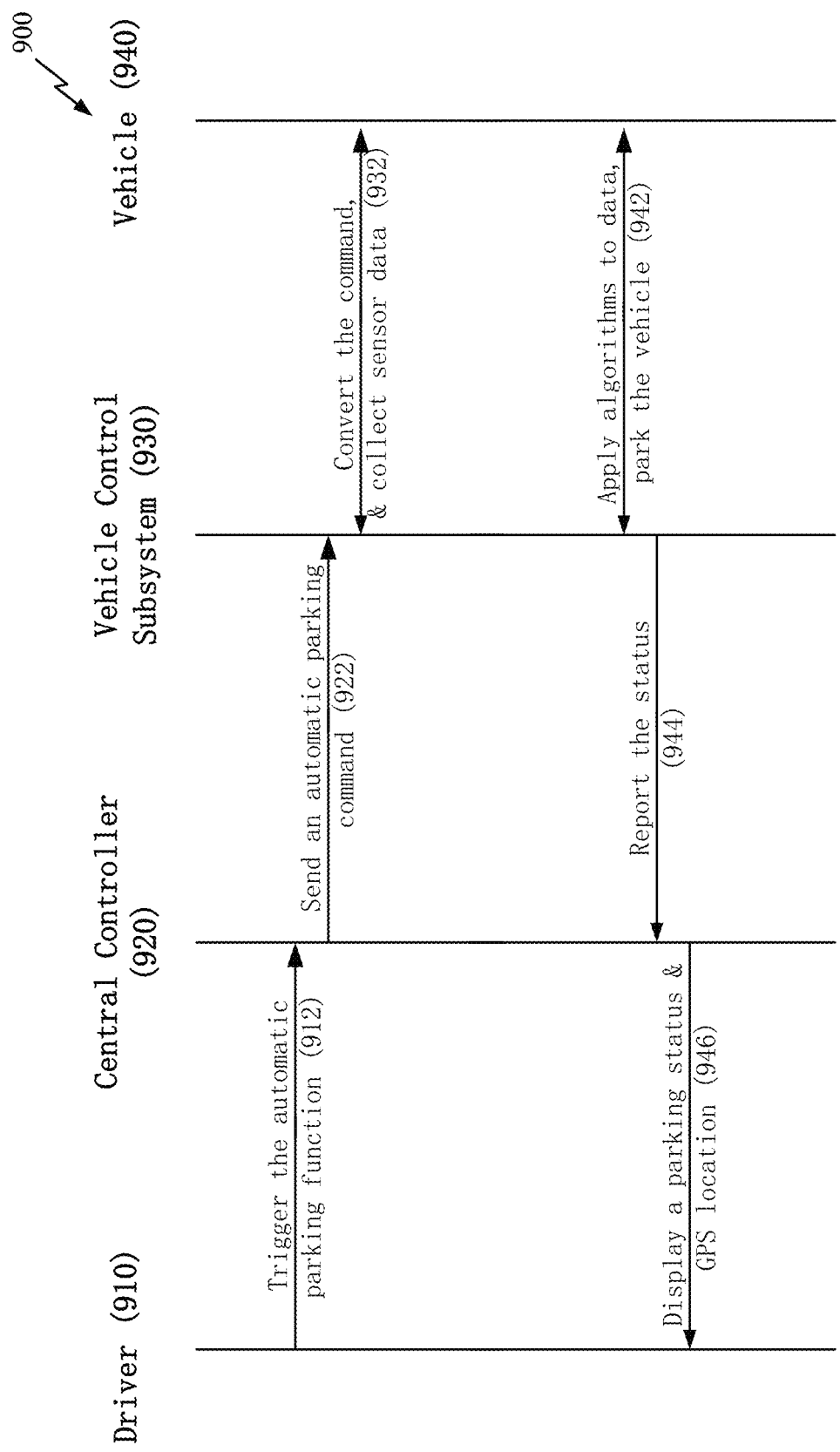
FIG. 9 provides a block diagram illustrating a process for an application example of automatic parking based on the in-vehicle gateway system, according to one aspect of the present disclosure.

FIG. 9 provides a block diagram illustrating a process 900 for an application example of automatic parking using an in-vehicle gateway system such as the in-vehicle gateway system 100 or 200, according to one aspect of the present disclosure. The automatic parking can be an application developed on the platform provided by the in-vehicle gateway system.

The driver 910 may trigger the automatic parking function at 912 via voice command or press of a menu button. In one configuration, a trigger action may be generated by an onboard navigation system. For example, when the driver 910 reaches a predefined destination, the onboard navigation system may issue an automatic parking command by itself.

The central controller 920 of the in-vehicle gateway system may send the "automatic parking" command to the vehicle control subsystem 930 at step 922 using an Ethernet switching fabric and a common communication channel. The vehicle control subsystem 930 accepts the "automatic parking" command at step 932, converts the command to a format specific to the vehicle 940, if appropriate, and then sends the command to the vehicle 940. The vehicle control subsystem 930, in collaboration with other subsystems, begins to search for a parking spot, performs parking function, and reports the status to the central controller 920 at step 944. The vehicle control subsystem 930, may collaborate with the ADAS subsystem and the power train control subsystem of the vehicle 940 to find the parking spot. The vehicle control subsystem 930 may search for the parking spot using Radar/Lidar, ultrasonic sensors, and video, and perform controls of the vehicle through the vehicle's power train control subsystem.

The central controller 920 displays the status in the local screen at step 946. Additionally, the central controller 920 may forward the status to the cloud server. The status includes parking action, GPS location, and warning information, among others. In one configuration, the vehicle control subsystem 930 may be a combination of the power train control 108 and ADAS subsystem 105 of FIG. 1, and the central controller 920 is the central controller 110a of FIG. 1.

One advantage of the in-vehicle gateway system is the flexibility and ease of adopting a new application. Described herein is another example of adopting a new application using the platform provided by the in-vehicle gateway system. For example, assume that a vehicle maker desires to add a vehicle auxiliary safety system to monitor the sensor status and check whether the sensor status and value are valid. If the sensor status and value are not valid, the in-vehicle gateway system may take actions, according to the criticality of the sensor data. In addition to the services provided by the in-vehicle gateway system, as described above, a sensor status and action table is used to help implement the vehicle auxiliary safety system. For example, a table can be configured via the configuration service to indicate the criticality level of an event. One example process of using the action table may include the following steps:

1) The central controller uses the configuration service to configure the action table.

2) The action table is transported to the vehicle control subsystem via the data service.

3) The central controller of the vehicle monitors the sensor status and carries out the corresponding action according to the action table. Table 1 below shows an example of the action table. For example, if the internal temperature sensor reaches a predefined level, the vehicle air conditioner is turned on or off. For another example, if the radar sensor detects an object within a predefined distance, the vehicle central controller may issue a command to the power train control subsystem to either brake or accelerate, depending on the distance and other condition. The power train control subsystem may also report the status to the central controller.

4) The central controller forwards the status to the cloud server via the cloud service and saves the status data via the data service.

TABLE 1

Vehicle Auxiliary Safety System Action Table

| Sensor | Action |
| --- | --- |
| Internal Temperature | Air conditioner |
| Radar | Brake, Accelerate |
| Carbon Monoxide | Alarm, Window operation |
| Oxygen concentration | Alarm, Window operation |
| Collision | Alarm |
| Acceleration transducer | Alarm |
| Gravity sensor | Alarm |

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a special-purpose sensor, an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a sensor device. In the alternative, the processor and the storage medium may reside as discrete components in a sensor device.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, or other optical disk storage, or any other medium that can be used to carry or store desired program code means in the form of instructions or data structures. Also, any connection is properly termed a computer-readable medium. For example, if the software is transmitted from a website, a remote server in a network cloud, or other remote source using a wired link such as a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An in-vehicle gateway system for monitoring and controlling a plurality of in-vehicle subsystems within a vehicle, comprising:
    a central controller configured to:
        enable a third in-vehicle subsystem to use a resource of a first in-vehicle subsystem by converting a command from the third in-vehicle subsystem to a unified control command that can be understood by each of the plurality of in-vehicle subsystems, wherein the resource of the first in-vehicle subsystem was originally exclusive to the first in-vehicle subsystems; and
        enable the third in-vehicle subsystem to use data from a second in-vehicle subsystem by converting the data to a common data format that can be read by each of the plurality of in-vehicle subsystems, wherein data from the second in-vehicle subsystems was originally exclusive to the second in-vehicle subsystems;
    a virtualization module configured to encapsulate the unified control command and data of the second in-vehicle subsystem in the common data format into Ethernet packets to be transmitted;
    a switch fabric configured to:
    interconnect the central controller to the plurality of the in-vehicle subsystems; and
    transmit at least the encapsulated unified control command from the third in-vehicle subsystem to the first in-vehicle subsystem and encapsulated data of the second in-vehicle subsystem in the common data format from the second in-vehicle subsystem to the third in-vehicle subsystem.

2. The in-vehicle gateway system of claim 1, further comprising a plurality of optional external connectors to support an addition of a new in-vehicle subsystem, wherein the third in-vehicle subsystem is a newly added in-vehicle subsystem.

3. The in-vehicle gateway system of claim 1, wherein the central controller is configured to:
    generate and issue the unified control command for monitoring or controlling at least one of the in-vehicle subsystems, wherein the unified control command comprises a control command structure common to the plurality of the in-vehicle subsystems; and
    filter, fusion and combine a plurality of types of pre-processed data or post-processed data from the plurality of in-vehicle subsystems, including data from multiple sensors.

4. The in-vehicle gateway system of claim 1, wherein one of the plurality of the in-vehicle subsystems comprises a set of associated in-vehicle devices and an interface between the central controller and the set of associated in-vehicle devices and wherein the plurality of the in-vehicle subsystems comprise a networking subsystem, an infotainment subsystem, an advanced driver assistance system (ADAS), a navigation subsystem, an Internet of Thing (IoT) and sensor gateway subsystem, a communication and security subsystem, an information technology (IT) peripheral device subsystem, and a storage subsystem.

5. The in-vehicle gateway system of claim 1, further comprising
    a power train control comprising at least one of an Ethernet-1T interface, an Ethernet interface, and a native interface, and configured to control one of a gasoline vehicle, an electric vehicle and a hybrid vehicle via a control command from the central controller or from an authorized mobile device;
    wherein the central controller further comprises
    a touch screen for a driver of the vehicle to input a control command and to display information from the plurality of the in-vehicle subsystems; and
    a policy-based decision module configured to generate the unified control command based on a plurality of input data from one or more of sensors and predefined policies.

6. The in-vehicle gateway system of claim 1, wherein the switch fabric comprises one or more of a controller area network (CAN), a CAN flexible date rate (CAN-FD), a local interconnect network (LIN), and an Ethernet Audio Video Bridging (AVB), a low-latency Ethernet switch fabric, and a one-pair Ethernet (Ethernet-1T) switch fabric.

7. The in-vehicle gateway system of claim 6, wherein the switch fabric in a one-to-one active and standby redundancy configuration, is configured to monitor a link status of the switch fabric and associated communication links, and to initiate a switchover when the switch fabric identifies a fault condition in an active switch unit of the switch fabric or one of the associated communication links.

8. The in-vehicle gateway system of claim 1, further comprising a virtualization module configured to represent in-vehicle devices as virtual entities and to provide a set of services to the central controller and the plurality of the in-vehicle subsystems, the set of services comprising a data service, a configuration service, a management service, a diagnosis service, a security service, and a cloud service.

9. The in-vehicle gateway system of claim 8, wherein the data service comprises storing and forwarding telemetry data collected by at least one or more in-vehicle devices, publishing the telemetry data to a remote server, and parsing and encapsulating the telemetry data into Ethernet packets to be transmitted to at least one of the central controller and one of the in-vehicle subsystems.

10. The in-vehicle gateway system of claim 8, wherein the configuration service comprises managing configuration files; the cloud service comprises communicating with a remote cloud server, and publishing or subscribing to requests from or responses to a remote resource management entity; the management service comprises deploying, upgrading, and configuring software components of the plurality of the in-vehicle subsystems based at least in part on the cloud service and the configuration service; the diagnostic service comprises verifying hardware connections of the in-vehicle gateway system and software features including a database operation verification, and a cloud server event verification; and the security service comprises providing protection against hacking, theft, distributed denial of service (DDoS) and counterfeit, a message encryption and authentication for secure connections and a support for a pseudonyms stack for privacy protection.

11. A method at an in-vehicle gateway system for monitoring and controlling a plurality of in-vehicle subsystems within a vehicle, comprising:
    in response to an input from a driver of the vehicle, enabling a third one of the plurality of the in-vehicle subsystems to use a resource of a first one of the plurality of the in-vehicle subsystems by converting, using a central controller, a command from the third one of the plurality of in-vehicle subsystems to a unified control command that can be understood by each of the plurality of in-vehicle subsystems, wherein the resource of the first one of the plurality of in-vehicle subsystems was originally exclusive to the first in-vehicle subsystems;

enabling the third one of the plurality of the in-vehicle subsystems to use data produced by a second in-vehicle subsystems by converting data of the second one of the plurality of in-vehicle subsystems to a common data format that can be read by each of the plurality of in-vehicle subsystems, wherein data from the second in-vehicle subsystems was originally exclusive to the second in-vehicle subsystems, and wherein the third one of the plurality of the in-vehicle subsystems is a newly added in-vehicle subsystem; and transmitting the unified control command from the third one of the plurality of in-vehicle subsystems to the first one of the plurality of in-vehicle subsystems using a switch fabric on one of associated communication links.

12. The method of claim 11, further comprising:
converting a native data format of the in-vehicle subsystem into a common data format for data to be sent to the central controller or another of the plurality of the in-vehicle subsystems; and
converting the common data format to the native data format or the unified control command to a native control command format to be sent to one or more of a set of associated in-vehicle devices.

13. The method of claim 11, further comprising:
monitoring a link status of the switch fabric and associated communication links; and initiating a switchover from an active switch unit to a standby switch unit of the switch fabric when the central controller identifies a fault condition in the active switch unit or one of the associated communication links, wherein the switch fabric comprises one or more of a controller area network (CAN), a local interconnect network (LIN), a CAN flexible date-rate (CAN-FD), an Ethernet CAN, a low-latency Ethernet switch fabric, Audio Video Bridging (AVB), and a one-pair Ethernet (Ethernet-1T) switch fabric.

14. The method of claim 11, further comprising performing one of a plurality of services by a software virtualization module that represents the plurality of in-vehicle devices as virtual entities, wherein the plurality of services comprises a data service, a configuration service, a management service, a diagnostic service, a security service, and a cloud service; and wherein the data service comprises storing and forwarding telemetry data collected by at least one of the in-vehicle subsystems, publishing the telemetry data to a remote server, and
parsing and encapsulating the telemetry data or collected sensor data into Ethernet packets to be transmitted to at least one of the central controller and one of the in-vehicle subsystems; the configuration service comprises managing configuration files; the cloud service comprises communicating with a remote cloud server, and publishing/subscribing requests from/responses to a remote resource management entity; the management service comprises deploying, upgrading, and configuring software components of the plurality of the in-vehicle subsystems using at least the cloud service and the configuration service; the diagnostic service comprises verifying hardware connections of the in-vehicle gateway system and software features including a database operation verification, and a cloud server event verification; and the security service comprises providing protection against hacking, theft, and counterfeit, a message encryption and authentication for secure connections, and a support for a pseudonyms stack for privacy protection.

15. The method of claim 11, further comprising adopting an in-vehicle subsystem using one of a plurality of optional connectors without a change to the plurality of the in-vehicle subsystems.

16. The method of claim 11, further comprising:
receiving the unified control command from the driver of the vehicle via a touch screen or a microphone; and
displaying and/or playing out a notification and a response from one of the plurality of the in-vehicle subsystems on the touch screen and/or a voice speaker.

17. An apparatus of an in-vehicle gateway system for monitoring and controlling a plurality of in-vehicle subsystems within a vehicle, comprising:
a memory; and
at least one processor coupled to the memory and configured to:
enable a third one of the plurality of the in-vehicle subsystems to use a resource of a first in-vehicle subsystems by converting a command from the third in-vehicle subsystem to a unified control command that can be understood by each of the plurality of in-vehicle subsystems, wherein the resource of the first one of the plurality of in-vehicle subsystems was originally exclusive to the first in-vehicle subsystems;
enable the third one of the plurality of the in-vehicle subsystems to use data from a second one of the plurality of the in-vehicle subsystems by converting data of the second in-vehicle subsystem to a common data format that can be read by each of the plurality of in-vehicle subsystems, wherein data from the second in-vehicle subsystems was originally exclusive to the second in-vehicle subsystems, and wherein the third one of the plurality of the in-vehicle subsystems is a newly added in-vehicle subsystem; and
generate a unified control command by a central controller in response to an input from a driver of the vehicle or an event from one of the plurality of the in-vehicle subsystems, for monitoring or controlling at least one of the in-vehicle subsystems, wherein the unified control command is transmitted using a switch fabric on one of associated communication links.

18. The apparatus of claim 17, wherein the at least one processor is further configured to:
convert a native data format of one of the plurality of the in-vehicle subsystems into a common data format for data to be sent to the central controller or another of the plurality of the in-vehicle subsystems; and
convert the common data format to the native data format or the unified control command to a native control command format to be sent to the in-vehicle subsystem.

* * * * *

UNITED STATES PATENT AND TRADEMARK OFFICE
CERTIFICATE OF CORRECTION

| | | |
|---|---|---|
| PATENT NO. | : 10,315,520 B2 | Page 1 of 1 |
| APPLICATION NO. | : 15/478248 | |
| DATED | : June 11, 2019 | |
| INVENTOR(S) | : Kuang-I Shu | |

It is certified that error appears in the above-identified patent and that said Letters Patent is hereby corrected as shown below:

On the Title Page

Under Assignee, item (73), please remove SOUTHWEST UNIVERSITY.

Signed and Sealed this
Twenty-first Day of November, 2023

Katherine Kelly Vidal
*Director of the United States Patent and Trademark Office*